United States Patent [19]

Petit

[11] Patent Number: 4,565,951
[45] Date of Patent: Jan. 21, 1986

[54] PROCESS AND ELECTRONIC DEVICE FOR THE CONTROL AND REGULATION OF THE SUPPLY CURRENT IN AN ELECTRIC MOTOR FED FROM A FIXED VOLTAGE DIRECT CURRENT SOURCE

[76] Inventor: Jean C. Petit, 50, Rue Robert Gaillard, 86100 Chatellerault, France

[21] Appl. No.: 684,780

[22] Filed: Dec. 21, 1984

[30] Foreign Application Priority Data

Dec. 21, 1983 [FR] France .................. 83 20511

[51] Int. Cl.[4] .......................... H02P 3/14
[52] U.S. Cl. ................... 318/317; 318/139; 318/376; 318/341; 363/124
[58] Field of Search ............. 363/124; 318/306, 308, 318/310, 314, 315, 317, 319, 316, 330, 331, 332, 333, 341, 342, 258, 269, 344, 345 R, 376, 345 CA, 345 AB, 318, 139

[56] References Cited

U.S. PATENT DOCUMENTS

| | | | |
|---|---|---|---|
| 3,656,039 | 4/1972 | Konrad | 363/124 X |
| 3,843,912 | 10/1974 | Anderson | 363/124 X |
| 3,914,671 | 10/1975 | Morton et al. | 318/139 |
| 3,999,111 | 12/1976 | Bailey | 318/139 X |
| 4,025,860 | 5/1977 | Shibata et al. | 318/139 X |
| 4,206,502 | 6/1980 | Harries et al. | 363/124 |
| 4,323,833 | 4/1982 | Watanabe et al. | 318/269 X |
| 4,352,049 | 9/1982 | Franz, Jr. | 318/269 X |
| 4,388,573 | 6/1983 | Horiuchi et al. | 318/139 X |
| 4,401,926 | 8/1983 | Morton et al. | 318/139 X |
| 4,500,949 | 2/1985 | Prete | 363/124 X |

Primary Examiner—Vit W. Miska
Assistant Examiner—Shik Luen Paul Ip
Attorney, Agent, or Firm—Beveridge, De Grandi & Weilacher

[57] ABSTRACT

Process for the control and electronic regulation of the supply current in an electric motor fed from a fixed voltage direct current source by means of a chopper controlled by logic signals for turn on (SI) and for turn off (S2), characterized in that a measuring voltage representing the current passing through the motor is produced, and also a command voltage representing the command current required to be imposed on the motor, in that the signals are compared and in that depending on the result of this comparison, the progressive positive or negative charge of a memory condenser (CM) is produced, the charge voltage of which is itself compared (A1) with a reference voltage.

7 Claims, 4 Drawing Figures

PROCESS AND ELECTRONIC DEVICE FOR THE CONTROL AND REGULATION OF THE SUPPLY CURRENT IN AN ELECTRIC MOTOR FED FROM A FIXED VOLTAGE DIRECT CURRENT SOURCE

The present invention relates to the control of electric motors fed by a direct current source, having electric vehicles as the main application.

The control of direct current motors is usually provided by variation of the voltage at the terminals of the motor, a voltage which is derived from a constant voltage by means of a variable cyclic ratio chopper.

For such a chopper, the most commonly used configuration is the configuration called Jones, described in particular in the manual of the Société Générale Electrique entitled "SCR MANUAL, 6th edition", 1979, pages 237 to 239. A description will also be found in the work by Marcel Mounic, "Semi-conducteurs" part 3, published by Editions Founcher in Paris in 1973, page 52.

Such a chopper essentially includes two thyristors, or equivalent avalanche switching devices, one used for establishing conduction in the motor circuit and the other for the discharge of a condenser applying an inverse voltage to the first thyristor in order to turn it off. The control of such a chopper is therefore a matter of sending the required pulses to the two triggers of the two thyristors with appropriate frequency and phase shift, such that this cyclic control of turning on and turning off produces an average voltage at the terminals of the motor.

In order that the overall efficiency remains acceptable, the operating frequency of the chopper must be relatively low, but on the other hand the cyclic ratio must allow a variation of about 0 to 99% of the maximum power. In general we begin with a conducting time of 1 ms and a non-conducting time of 20 ms, and we increase the power by progressively reducing the non-conducting time to about 1 ms, the conducting time remaining constant, then by increasing the conducting time to about 60 ms, the non-conducting time remaining constant.

The disadvantage of such control by voltage variation is that there is no control over the current passing through the motor. In fact, this current I is usually expressed by the formula:

$$I = (U - FCEM/R)$$

in which FCEM usually represents the counter-electromotive force, which is equal to zero when the speed of the motor is zero, and which becomes negative when the speed of the motor is reversed. U is the voltage at the terminals and R the resistance of the motor.

In these conditions, when the motor has a normal speed of rotation, the current passing through the motor is normal and depends on the resisting torque as well as on the motor torque, itself resulting from the control by the conductor of the chopper cyclic ratio which determines the value of U. On the other hand, if the motor is not turning, for example during a sudden start, a high stress or any anomaly, the current, by application of the above formula, becomes $I = U/R$, and as R is very low, I becomes very large. There is practically a short-circuit which triggers safety devices. On other hand when we come to the electrical braking of the motor, the motor is fed with reverse polarity voltage which means that the counter-electromotive force FCEM becomes negative, and the above formula shows that the voltage at the terminals of the motor is practically doubled, such that the current takes a very abnormal value which again triggers the safety devices.

The purpose of the present invention is to avoid the previous disadvantages by producing a device for the control of the triggers of the thyristors of the chopper which device provides regulation of current in the motor depending on a command value controlled by the user. It is therefore essentially a matter of control by current variation, in place of the usual control by voltage variation.

The invention essentially consists in comparing a signal representing the motor current and a command signal, and in providing as a function of the result of this comparison the progressive charge or discharge of a memory condenser, the state of charge of which with respect to a threshold value enables the determination of the start and stop times of conduction of the main thyristor.

Other details of the invention will appear in the following description of a mode of embodiment taken as an example and represented in the appended drawing in which.

Figure 1:
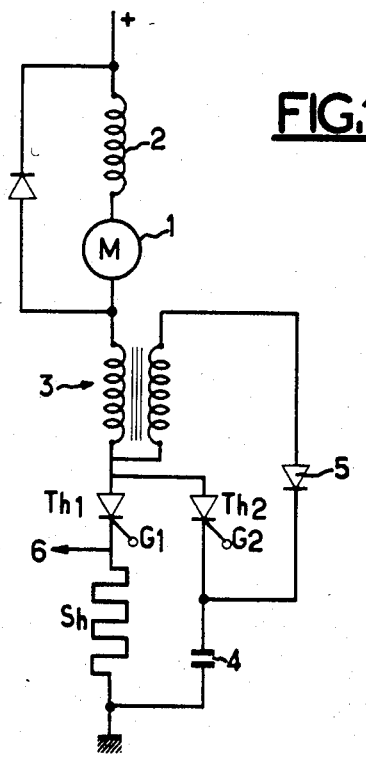
FIG. 1 represents the control diagram of the motor.

In FIG. 1 we see one of the possible wiring diagrams for the production of the Jones configuration. In particular we distinguish the electric motor with its armature 1 and its inductor 2, an autotransformer 3 of which the primary is taken to ground by the main thyristor Th1, as well as the turn off circuit with its thyristor Th2 and condenser 4, enabling the main thyristor Th1 to be turned off, and finally diode 5 enabling the condenser 4 to be charged via the secondary of the transformer 3.

In accordance with the invention a shunt Sh has simply been inserted between ground and the main thyristor Th1 in order to produce a voltage at point 6 proportional to the motor current. The entire control is therefore a matter of polarizing the triggers G1 and G2 of the two thyristors Th1 and Th2 with the required frequency and the required phase ratio.

Figure 2:
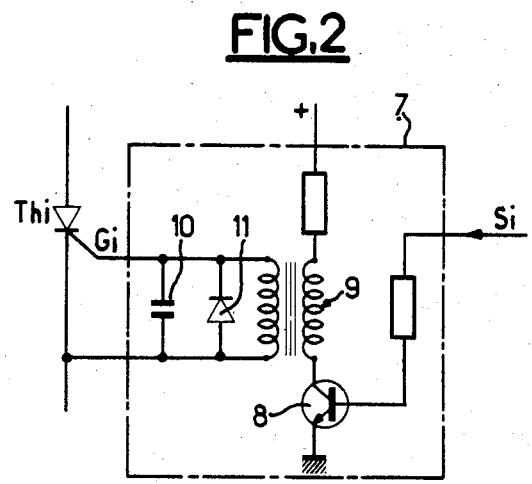
FIG. 2 represents the circuit for the control of the triggers of the thyristors from corresponding logic signals.

In order to do this, circuit 7 of FIG. 2 can be used, which enables, from a logic signal Si arriving on input, the control of trigger Gi of the corresponding thyristor Thi, it being understood that this circuit 7 is used twice, the index i taking the values 1 and 2 respectively.

In the circuit we recognize in particular a control transistor 8, controlled by its base from signal S, and controlling the current of the primary of a transformer 9 of which the secondary controls the trigger G, with a condenser 10 and a diode 11 connected in parallel.

Figure 3:
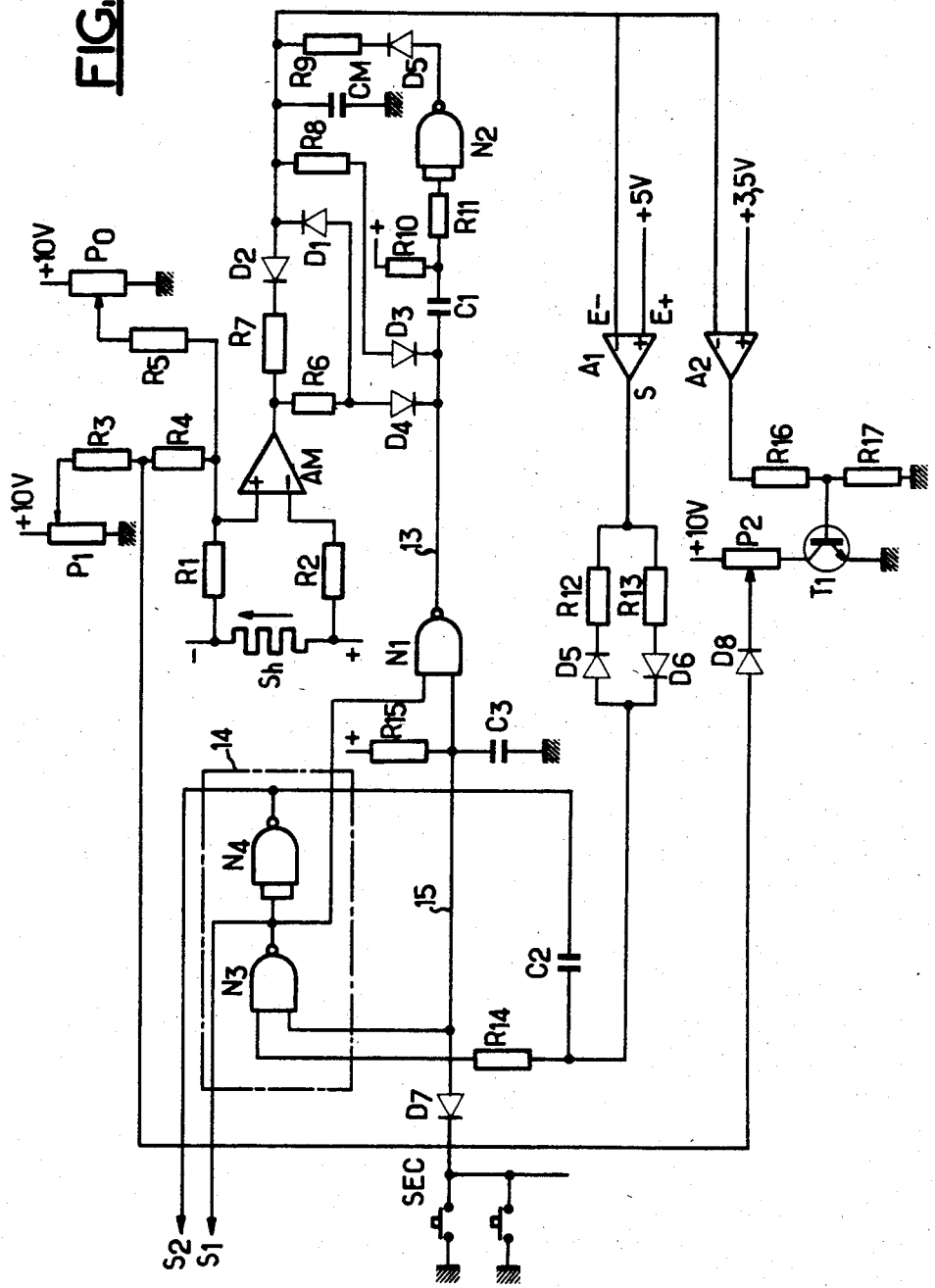
FIG. 3 represents the general diagram of the circuit for the production of the logic control signals.

The basis of the invention therefore resides in the circuit shown in FIG. 3 which is intended to produce the logic signals S1 and S2 for the control of the turn on and turn off thyristors, i.e. of the start and end of conduction of the chopper.

In FIG. 3 shunt Sh is shown inverted with respect to FIG. 1, i.e. with the lower potential terminal at the top. The two terminals of the shunt are connected to the direct and inverting inputs of a differential operational measuring amplifier AM, via two balance resistors R1 and R2, and inverted as shown on the figure, i.e. the terminal of the shunt at the higher potential is applied to the inverting input of amplifier AM.

P1 represents a control potentiometer which has the effect, via two resistors R3 and R4 connected in series, of raising potential of the point 12 situated between resistor R1 and the direct input of the amplifier AM. In this way the effect of operating potentiometer P1 is to raise the differential input voltage of amplifier AM, while the current flowing in the shunt Sh has the reverse effect.

Another potentiometer PO also enables, via a resistor R5, the slight raising of the potential of this same point 12 for zero adjustment.

The output of the amplifier AM controls, via a resistor R6 and a diode D1, the charging of a memory condenser CM when the output voltage is at the high level and its discharge via another diode D2 and a resistor R7 when this output is at the low level.

A NAND gate N1 has its output 13 normally at the 1 state, but when this goes to the zero state (i.e. when its two inputs are at the 1 state) it also provides via a diode D3 and a resistor R8 the negative charge of condenser CM, while a diode D4, connected between R6 and D1, cancels the effect of R6-D1 during this charge. Another NAND gate N2 is also provided which, combined with a resistor R10 and a resistor R11, as well as a condenser C1, forms a monostable multivibrator intended to initialize the charge state of the condenser CM via diode D5 and resistor R9.

The device also includes an inverting comparator A1 intended to test the charge voltage of the condenser CM with respect to a reference voltage and to provide an output signal at the high level or at the low level, via two different resistors R12 and R13, via two diodes D5 and D6 in series with each of these resistors respectively.

On the other hand, the device includes a double monostable multivibrator 14, formed by two NAND gates N3 and N4 connected in series as shown in FIG. 3, and which enables the timing of the measurement of the charge voltage of the condensers and the period of non-conduction of the thyristors, by means of resistor R14 and condenser C2 combined respectively with R12 and R13, and to deliver the control voltage pulses S1 and S2 for conduction and non-conduction respectively, for the power circuit.

The previously mentioned NAND gate N1 has one input connected to S1 and another input connected via a diode D7 to an external safety circuit SEC, this latter input incorporating a timing circuit formed by resistor R15 and condenser C3 such that the starting is timed and the device is subjected to the various external safety devices SEC represented diagramatically by push-buttons.

Finally the device includes a second inverting comparator A2 which detects the electrical braking current and enables, via a potentiometric configuration R16 and R17, the control of the base of a transistor T1 which sets the second terminal of an excess current adjustment potentiometer P2 to zero, the slider of this potentiometer being connected via a diode D8 to the mid point between the resistors R3 and R4 of the control potentiometer P1, such as to neutralize the command value in the case of excess current.

When the device is in the rest state, the SEC line is at zero potential and consequently output 13 of gate N1 is at the 1 level. The initial charge of CM by C1, R10, R11, N2, D5 and R9 is not carried out. The charge voltage of CM is that of the output of the amplifier AM transmitted by R6, D1 or by D2, R7 depending on the case. This potential corresponds to a level 20 of 4.5 V in FIG. 4, in which E+ and E− represent the direct and inverse input levels of A1 and S the output of A1. E− is therefore at +4.5 V while E+ corresponds to the reference voltage +5 V of A1. In these conditions (E+ >E−) the output S of the comparator A1 is at 1 (10 V), the output of R14 is at 1 and, because of N3, S1 is at zero potential: the power circuit is not conducting.

When the device is started, the safety line goes to its 1 level. After the timing operated by R15 and C3, the lower input 15 of gate N1 reaches the 1 level. By means of the control potentiometer P1, a current of 10 amps, for example, is set. The output reference voltage of amplifier AM becomes, for example, 6.5 V and consequently, through the R6 D1 network, the voltage of the condenser CM rises from 4.5 to 6.5 V, as represented by the rising curve 21 in FIG. 4.

At time t1 at which this rising curve 21 crosses the E+ horizontal, the inverting input E− of comparator A1 becomes positive with respect to the direct input E+ and the output S switches over to go from the 1 state to the zero state. Via the network R12, D5 and C2 which introduces a delay dt1, the multivibrator 14 switches over at time t2. Thus the output S1 goes from the zero state to the 1 state, the power circuit (FIGS. 1 and 2) is excited and becomes conducting, therefore feeding the motor, such that a current passes through the shunt Sh. Also, the two inputs of the gate N1 being at the 1 state, its output 13 goes to the zero state, which has the effect, by means of C1, R10, R11 and gate N2, of sending an initialization pulse 22 to condenser CM through D5 and R9.

The measuring amplifier AM detects the current passing through the shunt, and by means of resistor R7 and diode D2 lowers the voltage of the condenser CM.

As the motor current increases, the voltage of the E− input of amplifier A1 falls and finishes, at time t3, by becoming more negative than the E+ input, such that it switches over (point 23 on FIG. 4) and its output S goes to the 1 state. The input to multivibrator 14 is then via the network R13, D6, R14 and C2, and the delay dt2 produced by this network enables the growth in motor current during this time dt2 to be measured. At the end of this delay dt2 (time t4), the multivibrator 14 switches over and its output S2 goes from the 0 state to the 1 state, which makes the power circuit non-conducting. The growth in motor current during time dt2 is detected by the measuring amplifier AM, and the voltage obtained on output is stored by condenser CM.

After the main thyristor Th1 is turned off, the current supplied by the battery is zero and the voltage at the output of the measuring amplifier AM therefore returns to a voltage of 6.5 V corresponding to the current set by the control potentiometer P1.

Figure 4:
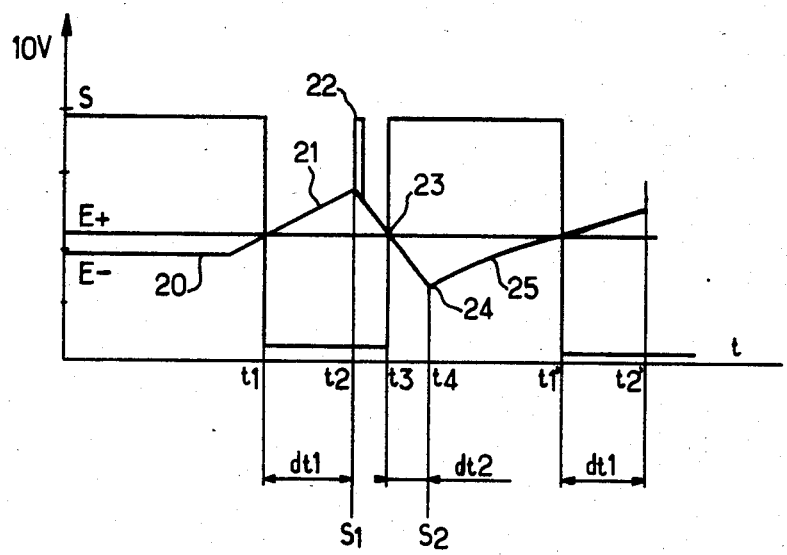
FIG. 4 the curve representing the input and output voltages of the comparator (11) as a function of time.

Starting from point 24, the condenser CM, the potential of which is negative with respect to the output potential of the amplifier AM, has its charge modified via resistor R6 and diode D1 according to the charging curve 25 represented in FIG. 4.

When the inverting input E− of comparator A1 becomes positive with respect to the direct input E+, the output S switches over and returns to the zero state, which is a return to the start of cycle state, time t1′ corresponding to time t1.

The result of the above is that:

(1) the conducting time from t2 to t4 is defined by the current absorbed by the motor, as it is a function of the initial charge of the condenser CM;

(2) the non-conducting time t4 to t2' is defined by the growth in current measured during the time dt1 of the first delay, and by the reference voltage of the control current, all these parameters being adjustable to obtain the desired regulation.

In the case in which a large command current is set by the control potentiometer P1, and in which that passing through the motor is low, the additional charging device intervenes through the network R8, D3. If we assume, for example, that potentiometer P1 commands a current of 100 amps, the output of the measuring amplifier AM is at 10 V. If the motor current is low, the output voltage of the amplifier AM will never fall below 9 V. The result of this is that the comparator A1 will never have its E− input becoming negative with respect to the E+ input. The device is therefore inhibited and there is no further current regulation. It is in order to avoid this disadvantage that there is an addition according to the invention of this additional charge device R8 D3 which ensures that the curve 23, 24 always has a minimal falling slope. Thanks to this device the functioning in this particular case becomes identical with the previously described functioning.

In the frequent case in which the power supply device is also used for obtaining electrical braking, i.e. feeding the motor with reverse polarity, the currents become very high, as explained earlier, but the device described adapts to it perfectly well. In this case, the second comparator A2 has the voltage of its + input, for example, at 3.5 V and its − input connected to the condenser CM. When, under the effect of the peak braking back-current, the voltage of A2 becomes negative with respect to the + input, the output switches over. Because of transistor T1, potentiometer P2 and diode D8, the action of the control potentiometer P1 is inhibited. No acceleration can therefore be produced as long as amplifier A2 is detecting braking current peaks. In addition the previously described regulation functions to limit the mean braking current.

I claim:

1. A process for electronically controlling and regulating the supply current in an electric motor fed from a fixed voltage, direct current source by means of a chopper comprising:

generating a measuring voltage, representing the current passing through the motor, and a command voltage representing the command current required to be imposed on the motor; comparing said measuring voltage and said command voltage; applying the results of said comparison to a memory condenser to produce a progressive positive or negative charge voltage in response thereto; generating a reference voltage; comparing said progressive charge voltage with said reference voltage; determining a first time delay period after said progressive charge voltage exceeds said reference voltage; generating a conduction initiation signal for the chopper upon expiration of said first time delay period to initiate application of conduction current to a motor connected to the chopper; reducing the difference between said measuring voltage and said command voltage; determining a second time delay period after said progressive charge voltage falls below said reference voltage; and generating a conduction cutoff signal for said chopper upon expiration of said second time delay period for terminating said conduction current.

2. A process as claimed in claim 1 further comprising generating a second reference voltage; detecting excess braking currents by comparison of the progressive charge voltage of the memory condensor with said second reference voltage; and inhibiting the effect of said command signal on said progressive charge voltage in response to detection of said excess braking current.

3. A device for electronically controlling and regulating the supply current in an electric motor fed from a fixed voltage, direct current source by means of a chopper, comprising:

a shunt coupled to the electric motor for producing a motor current representation signal;

potentiometric means for producing a command signal representing the command current required to be imposed on the motor;

a differential measuring amplifier for comparing said motor current representation signal and said command signal;

a memory condensor for storing a signal representative of the result of the comparison by said differential amplifier;

a positive charge circuit, responsive to the differential measuring amplifier output assuming a positive voltage for producing a voltage to selectively positively charge the memory condensor;

a negative charge circuit, responsive to the differential measuring amplifier output assuming a negative voltage for producing a voltage to selectively negatively charge the memory condensor;

a source of reference voltage;

a comparator for comparing the charge level of the memory condensor with said reference voltage;

means for determining a first time delay period after the charge level of said memory condensor exceeds said reference voltage;

means for generating a conductive initiation signal after said first time delay period;

means for adjusting said command signal to reduce the difference between said motor current representaton signal and said command signal;

means for determining a second time delay period after said progressive charge voltage falls below said reference voltage; and means for generating a conduction cutoff signal after said second time delay period to terminate said motor current.

4. The device as claimed in claim 3, further comprising a monostable multivibrator for initializing the charge state of the memory condensor.

5. The device as claimed in claim 3 further comprising an additional charge device for providing a minimum charge current to the memory condensor.

6. The device as claimed in claim 3 wherein the controlled motor and chopper include safety devices, said device further comprising a NAND gate for timing the start-up and connecting said device to the safety devices.

7. The device as claimed in claim 3, further comprising:

a source of a second reference voltage;

an inverting comparator for comparing the charge of the memory condensor with said second reference voltage to detect excess braking currents; and circuit means for inhibiting the effect of said command signal in response to detection of excess braking currents.

* * * * *